Dec. 13, 1960   G. B. HANSEN   2,964,442
METHODS OF MOLDING REINFORCED ORGANIC PLASTICS
FOR THE PRODUCTION OF CURVED PLATES
Filed Aug. 20, 1957
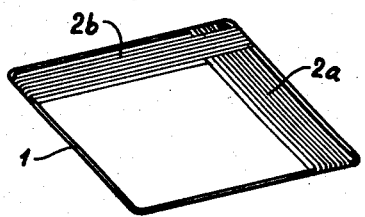
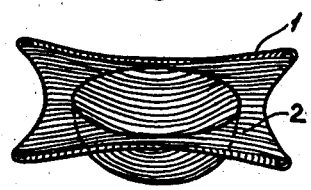
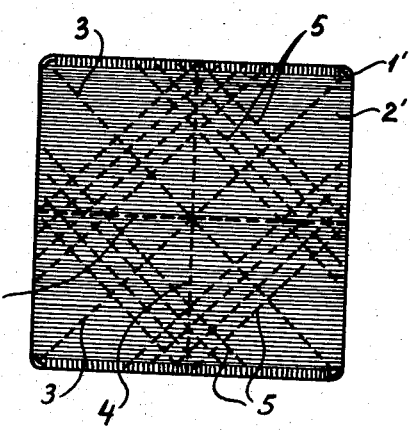
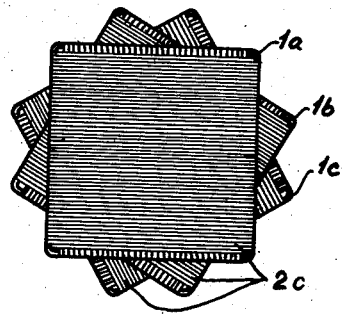
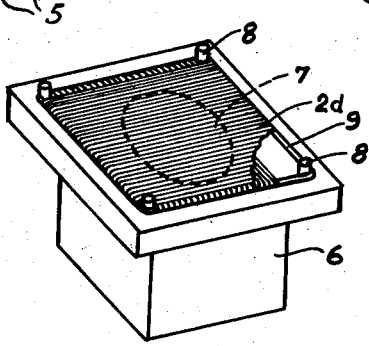
INVENTOR
Gunner Brun Hansen
BY
ATTORNEYS United States Patent Office 2,964,442
Patented Dec. 13, 1960

2,964,442
METHODS OF MOLDING REINFORCED ORGANIC PLASTICS FOR THE PRODUCTION OF CURVED PLATES

Gunnar Brun Hansen, Gentofte, Copenhagen, Denmark, assignor to Polyplex Danish-American Plastics Company, Copenhagen, Denmark Filed Aug. 20, 1957, Ser. No. 679,225

Claims priority, application Denmark Aug. 22, 1956

3 Claims. (Cl. 154—110)

This invention relates to improvements in methods of molding reinforced organic plastic materials for the production of plates and laminates, particularly curved articles, and for the provision of an improved reinforced unit for use in the manufacture of reinforced organic plastic articles, for example, curved plates.

In the manufacture of reinforced organic plastic plates, the reinforcing material used in such manufacture has hitherto been made largely of tissue which can be placed in the molds without difficulty. Curved plates are readily manufactured in this manner provided the reinforcing tissue is sufficiently loose to permit the individual filaments of the tissue, for instance glass filaments or threads, to slide to some extent relative to one another when the tissue is placed or spread over the mold.

One of the principal difficulties in prior methods of molding curved plates and laminates is the problem of keeping the tissue spread properly in the mold and of obtaining distribution of the elements of the tissue.

Accordingly it has been found that the qualities of reinforced plastic plates and laminates, particularly curved articles, can be substantially improved if the reinforcing material comprises one of more layers of individual filaments or threads instead of the usual tissues. The use of such filaments or threads, however, presents the further difficulty, particularly with curved shapes, to secure the filaments of the layers so that they will be distributed as desired and will always cross one another at angles which are not too acute. The present invention therefore relates to a special method of producing curved plates in which the drawbacks referred to above have been overcome.

The principal object of the invention is therefore to provide an improved method for molding reinforced organic plastic materials for the production of plates and laminates, particularly those having curved surfaces.

Another object of the invention is to provide an improved reinforcing unit for use in the improved method of molding of reinforced organic plastic articles.

According to the invention the objects and advantages thereof have been achieved by the making and use of a reinforcing unit in the molding method, the reinforcing unit being formed by winding the filaments in intercrossing layers on a polygonal, preferably rectangular frame the sides of which are resiliently bendable, particularly in the plane of the frame. The reinforcing unit thus formed, or a plurality of such units, together with the raw organic plastic material are placed between the parts of a mold and then subjected to pressure and other conditions in accordance with the molding technique for the particular organic plastic molding composition employed.

The improved method has the advantage that it is now possible to produce curved plates and laminates on a large scale and at such prices that the articles produced will have a widespread use. The method may be used in the production of plates for widely different purposes, for example, in the manufacture of helmets or other protecting means for military use, for crash helmets and other relatively highly curved plates.

The particularly marked strength obtained in a laminate of the type referred to is first of all due to the fact that the individual filaments or threads of the reinforcing units operate independently of one another and are not subjected to tearing or breakage when they are crossed by other filaments of the windings. Because of the use of the individual filaments in the manner referred to, each filament run is able to distribute a stress over a maximum area of the laminate, this resulting in the splitting up of the laminate over a rather large area when the laminate is fired at, thereby absorbing a great amount of energy and providing an exceedingly effective protection as a bullet-proof material.

In order to obtain the advantageous effect referred to, it is important, in accordance with the invention, that the reinforcing filaments or threads be uniformly distributed in the laminate.

In this connection, an important feature of the invention is that the filaments wound on the frame are kept under tension during the whole pressure molding operation and thereby held in place so that the desired uniform distribution of filaments over the whole area of the plate or laminate is obtained, particularly where the closeness of the winding of the filaments on the frame is adapted to the shape of the curved plastic plate to be molded.

In practice the improved method may be carried out in various ways. According to the invention it is preferable to use a frame having sides which are rigidly interconnected and which consist of resilient material, for example, of spring steel, spring bronze, or any other material having similar resilient properties. Such a frame is very simple and inexpensive to produce, but in certain cases, for instance for the production of plates or laminates of a particularly irregular shape, it is preferable to use a frame, the corners of which are fixed relatively to one of the mold parts and which has sides consisting of resilient strings thereby further improving the capability of the filaments carried by the strings for adapting themselves to the curved surface of the mold.

In the production of relatively thick laminates, two or more superposed thread-wound frames are preferably used as reinforcing, whereby the filaments on the frames are provided in layers rather far away from one another and can operate mutually independently. Furthermore, according to the invention, $n$ rectangular frame reinforcing units are used, which are uniformly displaced with respect to each other by an angle of $$\frac{90°}{n}$$

in the plane of the frames. A laminate is thereby obtained containing filaments extending in different directions and having to a very great extent the same strength in all directions.

In order to secure the filaments in position when producing highly curved plates or laminates, it has been found preferable to loosely interconnect intercrossing filaments, for instance by sewing in accordance with a pattern adapted to the shape of the curved plate or laminate to be produced. For the production of protecting helmets, or plate articles of a similar shape, it is preferable, according to the invention, to use rectangular shaped frames for the reinforcing units, the intercrossing filaments of which are loosely interconnected along the center lines and along the diagonals of the rectangular frames. Furthermore, according to the invention, it is also preferable to loosely interconnect the intercrossing filaments along lines parallel to the diagonals.

In order to make sure that the organic plastic material to be molded will surround and coat all of the various filament layers of the reinforcing unit or units, during the pressure molding of the laminate, a portion of the raw plastic material to be used in making the laminate may be placed directly on the filaments of each of the reinforcing units prior to incorporating the reinforcing unit or units into the mold.

Other features, objects and advantages of the invention will be brought out in the following more detailed description thereof taken in connection with the accompanying drawings forming a part of this application.

In the drawings:

Fig. 1 is a perspective view of a reinforcing frame, partly wound with filaments, for use in executing the method according to the invention;

Fig. 2 is a perspective view of the reinforcing frame unit shown in Fig. 1 completely wound with filaments and showing the positions assumed by the filaments and the sides of the frame after the unit has been cast as reinforcing in a dome-shaped plastic plate;

Fig. 3 is a plan view of a reinforcing frame unit like that shown in Fig. 1, but completely wound with filaments and provided with intercrossing filaments loosely stuck together.

Fig. 4 is a plan view of three superposed reinforcing frame units of the type shown in Fig. 1, and Fig. 5 is a perspective view of the lower part of a mold having mounted thereon a reinforcing frame unit to be used in connection with a special embodiment of the method and structure according to the invention.

Fig. 1 shows a rectangular frame 1 comprising a welded ring of a resilient material, for example, spring steel. This frame is first wound with a layer of filaments 2a and then with a further layer of filaments 2b crossing the filaments 2a at right angles so as to provide an upper and a lower layer of filaments on the frame. It will be noted that the filament or filaments 2a are wound around two opposite sides of the frame while the filament or filaments 2b are wound around the other two opposite sides of the frame so that the runs of the second winding enclose or surround the runs of the first winding. Suitable reinforcing filaments are employed such as glass fibres or threads, or threads of other suitable plastic reinforcing materials.

When a frame, such as the frame 1, is completely wound with filaments in both directions in the manner described and the frame 1 carrying its windings 2 is placed in a mold for the production of a highly-curved plate article, for example, a helmet, the filaments and resilient sides of the frame take up the positions shown in Fig. 2. The tension placed on the filaments by the shape of the mold deforms the frame in the manner illustrated in Fig. 2 so that the sides are inwardly bent. The corners of the frame will be simultaneously somewhat displaced towards the center of the frame.

The intercrossing filaments of a completely wound reinforcing frame unit may be loosely secured together by stitching or by sticking the intercrossing filaments to each other, in the manner illustrated in Figure 3. In this view, the intercrossing filaments of the windings 2' on the frame 1' are stuck together along diagonals 3, center lines 4 and also along lines 5 parallel to the diagonals 3, these lines, for example, representing stitching or means for sticking the intercrossing filament runs of the windings together. The zones in which the lines 5 occur are limited by the outer border lines 5, respectively parallel to the diagonals, so that the outer border lines 5 will connect the ends of the center lines 4 of the frame, as shown, while the inner lines 5 extend intermediately of the diagonals 3 and the border lines 5.

Fig. 1 shows the uniform distribution or spacing of the reinforcing filament winding runs on the frame 1. When a uniform distribution is desired in the production of a laminate having a curved shape, it is preferable to irregularly distribute the filament windings on the frame, because the filament windings will be spread more or less over the various parts of the mold depending on the curvature and the rise of the mold. In many cases it is preferable to provide for a more compact arrangement of the filaments in the center of the frame and at the outer edges thereof in the other parts of the filament layer or filament assembly on the frame.

Fig. 4 illustrates the use of three frames 1a, 1b and 1c carrying windings 2c, all wound in the manner described above in connection with Fig. 1, these three frames being superposed and angularly displaced by about 30°. When superposed reinforcement frames are used in this manner, a laminate is obtained containing reinforcement filaments extending in so many different directions that its strength will be considerably increased and be practically uniform in all directions.

Fig. 5 shows the lower part 6 of a mold having a concavity 7, in which, in cooperation with the upper part of the mold, not shown, a curved plate may be pressure molded to form a laminate. The lower part 6 of the mold is provided with four pins 8 disposed in the corners of a rectangle of the mold, and an elastic string 9 is drawn around these pins carrying windings 2d of filaments of the type of the windings on the frame shown in Fig. 1. During the pressure molding operation the filament windings will assume substantially the same positions or give substantially the same configuration as that shown in Fig. 2, and the elastic string 9 will be deformed in approximately the manner as the frame in Fig. 2. The greater resiliency of the elastic string, however, permits the production of articles of a marked concave shape, the elasticity of the string reducing the tension on the reinforcing filaments so that a great number of windings of extremely thin filaments may be used.

In using the elastic string, filaments must, of course, be wound on a rigid frame designed to be disassembled, on which the elastic string has been mounted. When the windings are complete the frame is disassembled and the elastic string carrying the windings is transferred to the four pins 8 of the mold. Such a frame forms no part of the present invention since the winding on the elastic string may be executed by other suitable supports for the string during the winding operation.

It will be noted that the reinforcing unit or units are embedded in the body of the organic plastic laminate in such a manner that the frame or frames are not embedded directly in the body of the plastic but only the filament windings 2a extending in one direction and the filament windings 2b extending in the opposite direction are embedded.

After the molding the frame or frames are cut away together with the parts of the filament extending from the plastic body.

While in the foregoing description and drawings the invention has been described solely in connection with the use of rectangular shaped frames, it is to be understood that a hexagonal frame may be used, preferably in the form of a regular hexagon so as to obtain a greater number of winding directions for the filaments. Furthermore, the number of filament layers and the number of frames used in a particular laminate may be varied within very wide limits with due regard to the shape of the curved plate to be produced. The frames shown in Figs. 1 to 4 are made of round wire, but wires having a different profile may also be used so as to secure, for example, a greater rigidity of the sides of the frame in a direction at right angles to the plane of the frame. In addition, the cross-section of the wire along the sides of the frame may be varied so that the resiliency of the frame sides will also vary with due regard to the shape of the article to be produced. In many cases extremely favorable results are obtained by giving the reinforcing filaments a pre-stressing, which may be varied by changing the profile and thickness of the sides of the frame.

What I claim is:

1. In the method of molding a helmet of reinforced organic plastic materials in a two part mold shaped to form the helmet in which the reinforcing is placed between the two parts of the mold together with the organic plastic materials to be molded, the steps comprising winding a plurality of layers of filaments on a number of plane polygonal frames, the sides of each frame being resiliently bendable in the plane of the frame, the filaments in one layer crossing the filaments in an adjacent layer, each of said frames limiting an area greater than the area of the helmet to be molded, placing the frames carrying the wound filaments between the two parts of the mold together with the organic plastic material, moving the two parts of the mold toward one another thereby deforming the intercrossing layers of wound filaments carried by the frames to correspond to the shape of the mold for the helmet and simultaneously bending the sides of the frames inwardly, and subjecting the contents of the mold to molding conditions to produce a reinforced plastic helmet.

2. The method as claimed in claim 1, including the steps of varying the closeness of the windings of the filaments on each frame relative to the curvature of the helmet thereby obtaining a uniform distribution of the filaments during the molding operation.

3. The method of molding a reinforced organic plastic article having curved surfaces in a two part mold shaped to form the article having the curved surfaces, in which the reinforcing for the article is placed between the two parts of the mold together with the organic plastic material to be molded, the steps comprising winding a plurality of layers of filaments on a number of plane polygonal frames to form the reinforcing for the article, the sides of each frame being resiliently bendable in the plane of the frame, the filaments in one layer crossing the filaments in an adjacent layer, each of said frames limiting an area greater than that of the area of the article to be molded, placing the frames carrying the wound filaments in superposed relation between the two parts of the mold together with the organic plastic material to be molded closing the two parts of the mold on the wound filaments and organic plastic material, deforming the intercrossing layers of wound filaments carried by the frames to correspond to the shape of the mold for the article and simultaneously bending the sides of the frames inwardly by the closing of the two parts of the mold, and subjecting the organic plastic material in the mold to molding conditions to produce the reinforced organic plastic article having curved surfaces.

References Cited in the file of this patent

UNITED STATES PATENTS

| | | |
|---|---|---|
| 662,963 | Preston et al. | Dec. 4, 1900 |
| 2,207,158 | Neville et al. | July 9, 1940 |
| 2,285,967 | Hardy | June 9, 1942 |
| 2,332,373 | Dorough et al. | Oct. 19, 1943 |
| 2,418,904 | Rugeley et al. | Apr. 15, 1947 |
| 2,500,598 | Axelrod | Mar. 14, 1950 |
| 2,699,415 | Nachtman | Jan. 11, 1955 |